(12) United States Patent
Raghavan (10) Patent No.: US 9,423,866 B2
(45) Date of Patent: Aug. 23, 2016

(54) ASYNCHRONOUS PROCESSOR THAT ADJUSTS A RESPECTIVE OPERATING VOLTAGE FOR CAUSING A TASK TO CONSUME SUBSTANTIALLY ALL OF A RESPECTIVE ALLOCATED TIME INTERVAL FOR THE TASK

(71) Applicant: Gopal Raghavan, Thousand Oaks, CA (US)

(72) Inventor: Gopal Raghavan, Thousand Oaks, CA (US)

(73) Assignee: Eta Compute, Inc., Westlake Village, CA (US)

( * ) Notice: Subject to any disclaimer, the term of this patent is extended or adjusted under 35 U.S.C. 154(b) by 0 days.

(21) Appl. No.: 14/801,010

(22) Filed: Jul. 16, 2015

(65) Prior Publication Data
US 2016/0018869 A1    Jan. 21, 2016

Related U.S. Application Data

(60) Provisional application No. 62/025,356, filed on Jul. 16, 2014.

(51) Int. Cl.
| G06F 1/26 | (2006.01) |
| G06F 1/32 | (2006.01) |
| G06F 1/00 | (2006.01) |

(52) U.S. Cl.
CPC .............. *G06F 1/329* (2013.01); *G06F 1/3203* (2013.01)

(58) Field of Classification Search
CPC ...... G06F 1/329; G06F 1/3203; G06F 9/4893
USPC .......................................................... 713/320
See application file for complete search history.

(56) References Cited

U.S. PATENT DOCUMENTS

| 5,752,070 A | 5/1998 | Martin et al. |
| 5,887,129 A | 3/1999 | Day et al. |
| 5,973,944 A | 10/1999 | Nork |
| 6,658,550 B2 | 12/2003 | Martin et al. |
| 6,788,039 B2 | 9/2004 | Abdoulin |
| 7,779,412 B2 | 8/2010 | Lin et al. |
| 7,941,650 B2 | 5/2011 | Kim et al. |
| 8,250,395 B2 | 8/2012 | Carter et al. |
| 8,572,539 B2 | 10/2013 | Cortadella et al. |
| 8,933,681 B2 | 1/2015 | Giannopoulos et al. |
| 2008/0282074 A1* | 11/2008 | Jacobowitz ........... G06F 1/3203 713/1 |
| 2010/0083019 A1* | 4/2010 | Aoki ..................... G06F 1/3203 713/320 |
| 2012/0303856 A1* | 11/2012 | Nakanose ............... G06F 13/28 710/308 |
| 2013/0151879 A1* | 6/2013 | Thomson ................ G06F 1/329 713/322 |
| 2014/0089694 A1* | 3/2014 | Culbert ................... G06F 1/329 713/320 |
| 2015/0178138 A1* | 6/2015 | Saha ..................... G06F 9/5094 718/104 |

OTHER PUBLICATIONS

C.H. Van Berkel et al., "Applications of Asynchronous Circuits", Scanning the Technology, Proceedings of the IEEE, vol. 87, No. 2, Feb. 1999, http://www.cs.columbia.edu/~nowick/async-applications-PIEEE-99-berkel-josephs-nowick-published.pdf, last accessed Jul. 16, 2015, pp. 223-233.

* cited by examiner

*Primary Examiner* — Robert Cassity
(74) *Attorney, Agent, or Firm* — SoCal IP Law Group LLP; John E. Gunther (57) ABSTRACT

There are disclosed asynchronous computing devices and methods of operating asynchronous computing devices. An asynchronous computing device may include an asynchronous processor and a voltage regulator circuit that outputs an operating voltage to the asynchronous processor in response to a voltage request received from the asynchronous processor.

16 Claims, 7 Drawing Sheets

ASYNCHRONOUS PROCESSOR THAT ADJUSTS A RESPECTIVE OPERATING VOLTAGE FOR CAUSING A TASK TO CONSUME SUBSTANTIALLY ALL OF A RESPECTIVE ALLOCATED TIME INTERVAL FOR THE TASK

RELATED APPLICATION INFORMATION

This patent claims priority from Provisional Application No. 62/025,356, titled Asynchronous Processor, filed Jul. 16, 2014.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to processor devices, and particularly to asynchronous processors operating from a variable power supply voltage.

2. Description of the Related Art

In this patent, the term "processor" means a digital circuit that executes stored instructions. A processor as referred to herein may be a microprocessor, a microcontroller, a digital signal processor, a graphic processor, a coprocessor, a network processor, or some other type of processor. Most digital processors in use today are synchronous, which is to say various elements within the digital processor operate synchronously in response to a common clock signal. The power consumption of synchronous digital processor may be estimated by the formula $$p=0.5fcv^2,$$

where: p=power consumption,
f=clock frequency,
c=average internal capacitance charged or discharged on each clock cycle, and
v=power supply voltage.

For example, assume that a synchronous digital processor can be operated with a 1 GHz clock frequency at a power supply voltage of 1.0 volt. Further assume that, when operated at 1 GHz and 1 volt, the power consumption of the processor is 0.5 watt. With these assumptions, a processing task that requires 1 million clock cycles can be completed in 1 millisecond with an energy cost of 0.5 watt×1 millisecond=0.5 millijoules.

However, suppose that a time period of 1 second was actually available to complete this processing task. The task could be performed by operating the processor with a clock rate of 1 MHz. A power supply voltage of only 0.4 volts may be sufficient to run the processor with a 1 MHz clock. In this case the power dissipation of the processor (fcv^2) would drop to $0.5(1/1000)(0.4)^2=0.08$ mW. However the processor would run for a full second to complete the task, so the energy cost of the task would be =0.08 mW*1 second=0.08 mJ. Thus, in this example operating the processor at a lower clock speed and commensurate lower voltage reduces the energy consumption by a factor of about 6 better compared to intermittent full speed operation. In general, the energy cost of a processing task will be minimized if the task is completed over the maximum available time period at the slowest possible clock speed and power supply voltage.

Current production processor integrated circuits are synchronous and the methodology and tools for designing synchronous processor circuits are well developed, so long as the processor circuit is designed to operate from a power supply voltage substantially above the threshold voltage of the transistors comprising the processor. While research papers have shown that near-threshold operation of synchronous processors (i.e., operation with a power supply voltage near the transistor threshold voltage) may be possible, process variations and operating temperature variations can cause the delay of near-threshold circuits to vary by a factor of up to 100. Additionally, for near-threshold operation, transistor leakage currents are neither well-modeled nor well-controlled in production processes. Thus modeling delay accurately in circuits for near-threshold voltage operation is challenging, and current design tools are not suited to the design of near-threshold synchronous processors. As a consequence, near-threshold voltage operation in synchronous designs has been limited to research only.

It is possible to dynamically change the clock speed and/or power supply voltage for a synchronous processor in response to varying processing demand. However, an additional problem with synchronous processors is a need to reset/pause the processor whenever the clock frequency or voltage is changed. This results in wasted power and time that limits the benefits of dynamically changing the clock speed and/or power supply voltage.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
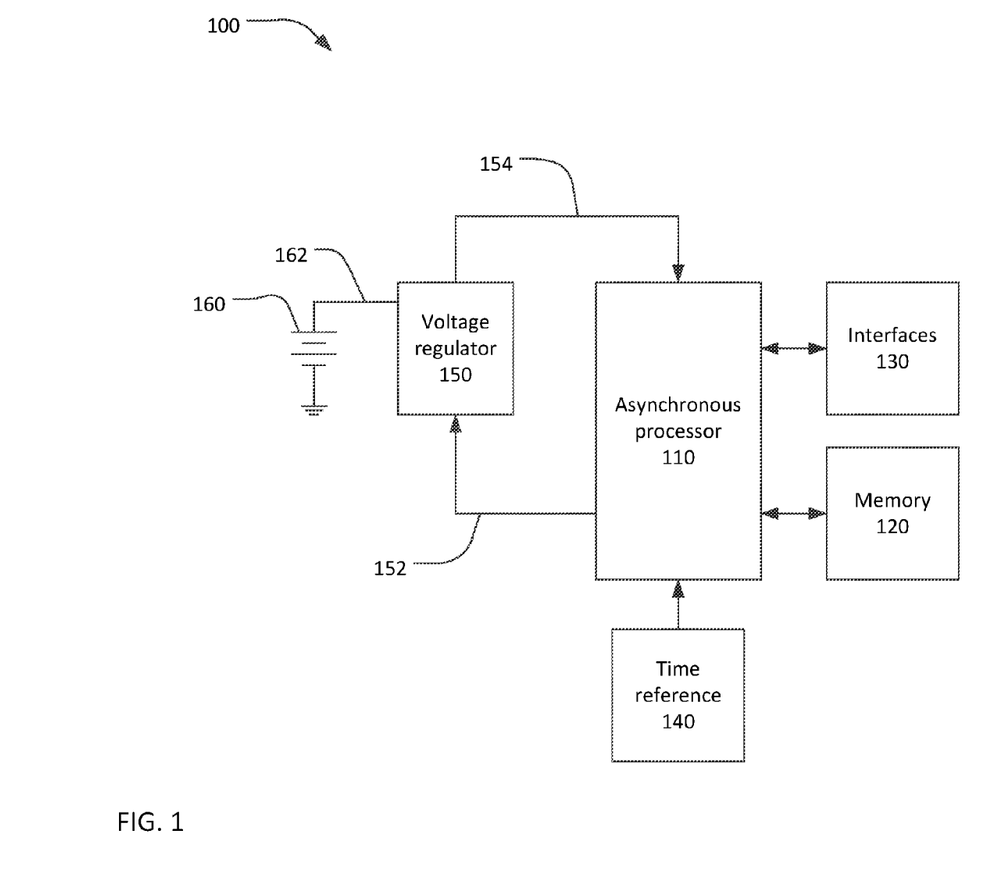
FIG. 1 is a block diagram of an asynchronous computing device.

FIG. 1 is a block diagram of a computing device 100 including an asynchronous processor 110, memory 120, interfaces 130, a time reference 140, and a voltage regulator 150. The asynchronous processor 110 may be a collection of asynchronous logic circuits that are collectively capable of executing instructions stored in the memory 120.

The memory 120 may be or include read-only memory, random access memory, and flash memory or other nonvolatile writable memory. The memory 120 may include one or more storage devices that allow for reading and/or writing data to a storage medium. Storage devices include hard disk drives, DVD drives, flash memory cards, and others. Storage media include, for example, magnetic media such as hard disks, optical media such as compact disks (CD-ROM and CD-RW) and digital versatile disks (DVD and DVD±RW); flash memory devices; and other storage media. As used herein, the term "storage medium" means a physical object for storing data and does not include transitory media such as electrical or optical signals or propagating waves.

The interfaces 130 may include circuits, firmware, and/or software to couple the asynchronous processor 110 to systems and devices external to the computing device 100. For example, the interfaces 130 may couple the asynchronous processor 110 to one or more networks, which may be a local area network, a metro area network, and/or a wide area network which may be or include the Internet. The interfaces 130 may couple the asynchronous processor 110 to input devices such as a keyboard, a mouse, or a touch screen, and to output devices such a display device. The interfaces 130 may couple the asynchronous processor 110 to other devices such as sensors and transducers.

The time reference 140 may provide a reference by which the asynchronous processor 110 can measure the time taken to complete various tasks performed by the computing device 100. For example, the time reference 140 may include a crystal oscillator or other frequency standard and a counter. The time reference 140 may interrupt the asynchronous processor 110 at periodic intervals. The time reference 140 may generate a time value that can be read by the asynchronous processor 110 as required. The time reference 140 may convey the time to the asynchronous processor 110 in some other manner.

The voltage regulator 150 may receive a primary voltage 162 from a battery 160 or another voltage source. The voltage regulator 150 may be responsive to a voltage request 152 provided by asynchronous processor 110. The voltage request 152 may indicate a requested operating voltage level. The voltage request 152 may convey the requested operating voltage level by way of an analog voltage or current value, a digital value, a frequency modulated signal, a pulse-width modulated signal or in some other manner. The voltage regulator 150 may be responsive to the voltage request, which is to say the voltage regulator outputs an operating voltage 154 at the requested operating voltage level to power the asynchronous processor 110. The interfaces 130, the memory 120, and the time reference 140 may be powered from the primary voltage 162, the operating voltage 154, or some other voltage (not shown). For example, the memory 120 may be or include static random access memory (particularly static random access memory using eight-transistor or ten-transistor memory cells) powered by the operating voltage.

Software executed by the asynchronous processor 110 may control the voltage regulator 150 to dynamically control the combination of processor power consumption and speed over a wide range. In most applications, the asynchronous processor 110 will execute stored software programs to accomplish one or more time-constrained processing tasks. For example, the computing device 100 may be a node within the so-called "Internet of Things". For more specific examples, the computing device 100 may be applied within an industrial process controller, a home appliance, a remote weather station, or some other time-constrained processing applications. In this context, the term "time-constrained processing task" means a processing task subject to at least one real-world time constraint. The time constraint may be a predetermined time period in which the task must be completed. The time constraint may be a predetermined time interval at which, or within which, the task must be repeated. A task may be subject to multiple time constraints. For example, the time constraints on a task may be (1) that the task must be repeated at predetermined intervals, and (2) that the task must be performed within a predetermined portion of each time interval (e.g., the task must be performed within the first second of each minute). A task may be subject to some other form of time constraint. The asynchronous processor 110 may control the voltage regulator 150 such that each task is performed by the computing device 100 using the lowest voltage that allows the task to be completed within the respective time constraints to achieve the lowest practical power consumption.

The computing device 100 is shown divided into functional elements in FIG. 1 for ease of discussion. This does not imply a corresponding physical structure. Each functional element may be divided between two or more integrated circuit chips, circuit devices, or modules, and all or portions of two or more functional elements may be implemented within a single integrated circuit chip, circuit device, or module. For example, the asynchronous processor 110 and all or portions of the memory 120, the interfaces 130, the time reference 140, and the voltage regulator 150 may be implemented as a "system on a chip", which is to say implemented within a single integrated circuit chip.

The voltage regulator 150 may be a switching regulator circuit implemented with semiconductor devices such as transistors and diodes and one or more passive components such as inductors and/or capacitors. At least some of the voltage regulator's semiconductor devices may be formed on an integrated circuit chip that also contains most or all of the asynchronous processor 110. All of the voltage regulator's semiconductor devices may be formed on the integrated circuit chip containing most or all of the asynchronous processor 110, with one or more of the voltage regulator's passive components located external to the integrated circuit chip. The voltage regulator 150 may be a switched capacitor regulator, commonly called an "inductorless" voltage regulator. In this case, the entire voltage regulator 150 may be formed on the integrated circuit chip containing most or all of the asynchronous processor 110. The voltage regulator 150 may be external to the integrated circuit chip or chips containing the asynchronous processor 110.

The integrated circuit chip containing most or all of the asynchronous processor 110 (and, optionally, all or portions of the memory 120, the interfaces 130, the time reference 140, and the voltage regulator 150) may be an application specific integrated circuit (ASIC) or a programmable circuit device such as a field programmable gate array (FPGA), a programmable logic device (PLD), or a programmable logic array (PLA). The integrated circuit chip containing most or all of the asynchronous processor 110 may typically be designed using a hardware description language (HDL) that defines the integrated circuit chip primarily in functional terms. The HDL design may be verified using an HDL simulation tool. The verified HDL design may then be converted into a gate netlist or other physical description of the integrated circuit chip in a process commonly termed "synthesis". The synthesis may be performed automatically using a synthesis tool. The gate netlist or other physical description may be further converted into programming code for implementing the integrated circuit chip in a programmable device. The gate netlist or other physical description may be converted into process instructions and masks for fabricating the integrated circuit chip as an application specific integrated circuit (ASIC).

Figure 2:
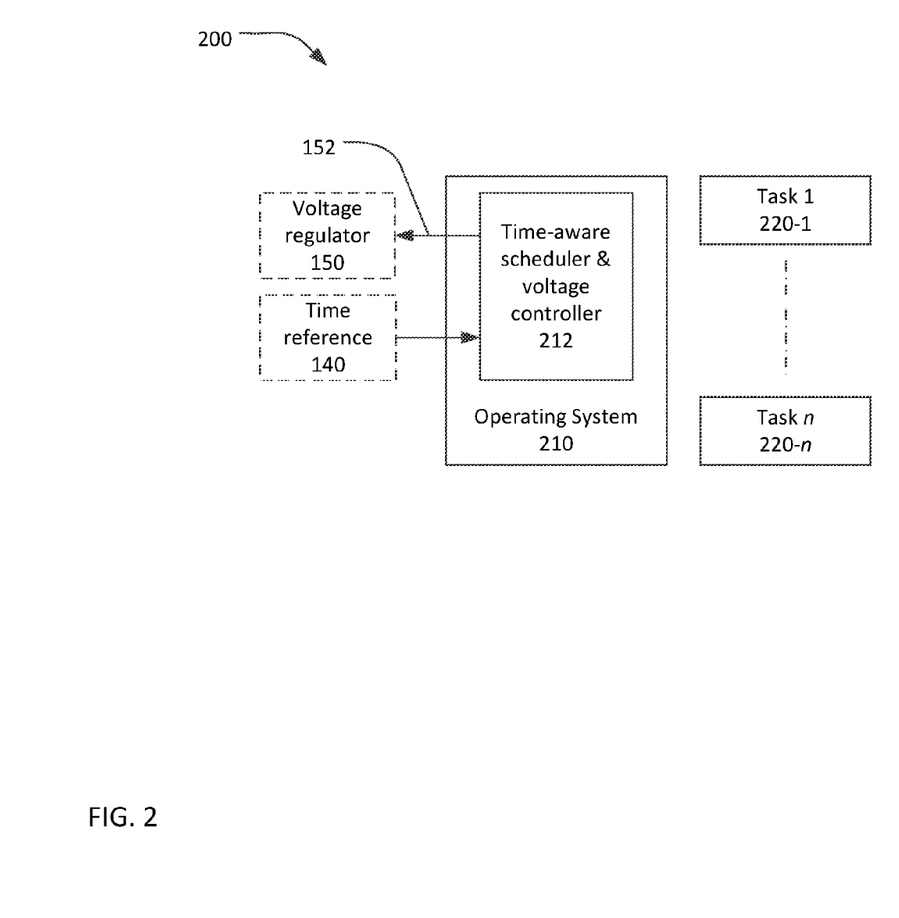
FIG. 2 is a logical block diagram of software operating on an asynchronous computing device.

Referring now to FIG. 2, the software 200 run by a computing device, such as the computing device 100, may include a real-time operating system 210 and n processing tasks 220-1 to 220-n, where n is a positive integer. Each of the n time-constrained processing tasks 220-1 to 220-n may be respectively subject to at least one time constraint as previously described. The operating system 210 and the n time-constrained processing tasks 220-1 to 220-n may be embodied by instruction stored in a memory, such as the memory 120, for execution by an asynchronous processor such as the asynchronous processor 110.

The operating system 210 may perform basic tasks, such as controlling and allocating memory, prioritizing the execution of the time-constrained processing tasks 220-1 to 220-n, controlling input and output devices, facilitating networking, and managing files. The operating system 210 may include a time-aware scheduler and voltage controller 212. The operating system 210 may include other elements (not shown) such as a communications stack and device drivers for input and output devices.

The time-aware scheduler and voltage controller 212 may schedule execution of the time-constrained processing tasks 220-1 to 220-n in accordance with the respective time constraints while attempting to minimize the power consumption of the computing device. To this end, the time-aware scheduler and voltage controller 212 may be coupled to the time reference 140 as previously described. To minimize power consumption, the time-aware scheduler and voltage controller 212 may cause the execution of some or all of the time-constrained processing tasks 220-1 to 220-n to fill substantially all of the available time for each task. In this context "substantially all" means as much as practical after allowances for variations in processor performance and time required to transition between processes. To this end, the time-aware scheduler and voltage controller 212 may select a respective operating voltage level for some or all of the processing tasks 220-1 to 220-n to control the execution speed of each task. The time-aware scheduler and voltage controller 212 may then provide, to the voltage regulator 150, a voltage request 152 for each time-constrained processing task 220-1 to 220-n indicating a respective requested operating voltage level for each task. The voltage request 152 may convey the requested operating voltage level for each task by way of an analog voltage or current value, a digital value, a frequency modulated signal, a pulse-width modulated signal or in some other manner.

Figure 3:
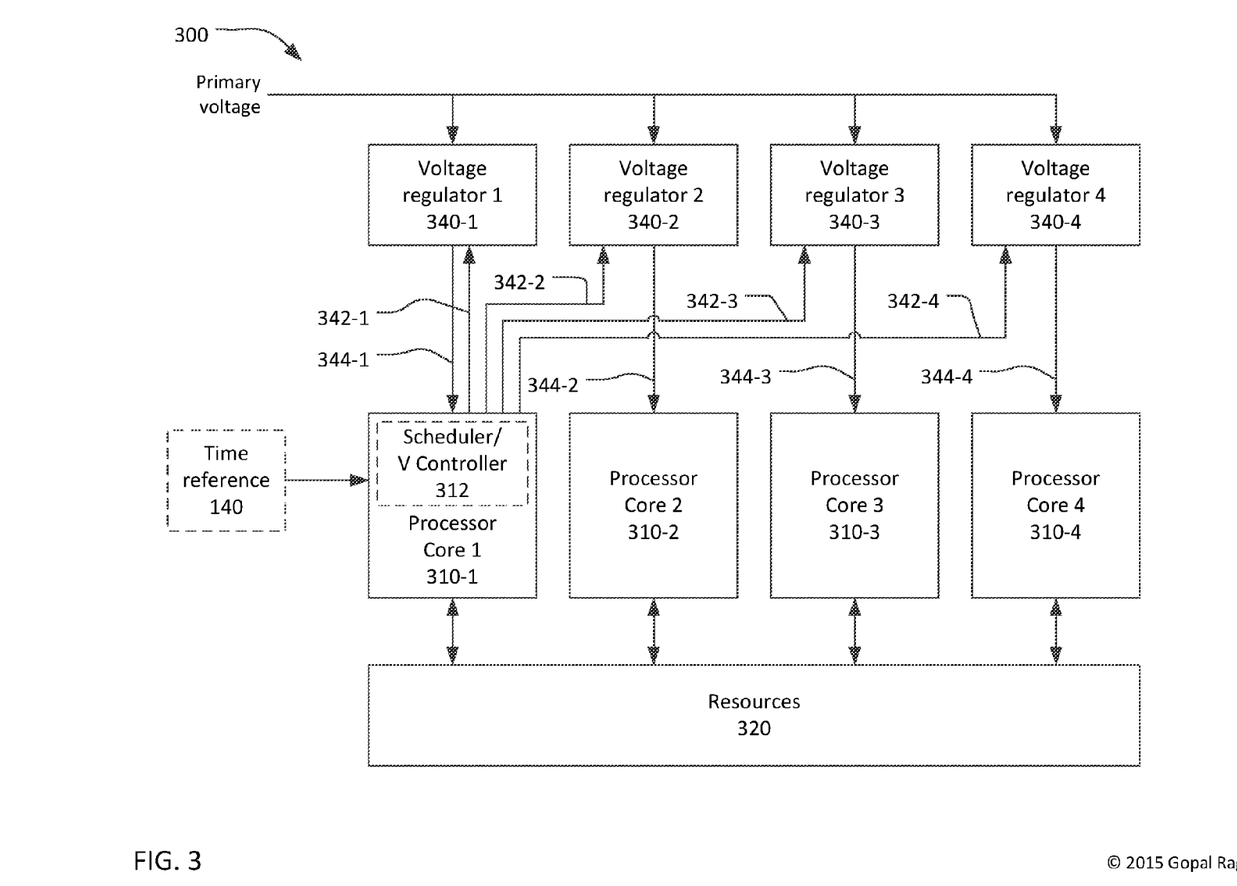
FIG. 3 is a block diagram of a multi-core asynchronous computing device.

Referring now to FIG. 3, an asynchronous processor may have multiple processor cores. In the example FIG. 3, the asynchronous processor 300 includes four processor cores 310-1, 310-2, 310-3, and 310-4. An asynchronous processor may have fewer or more than four processor cores.

Each processor core 310-1 to 310-4 may access resources 320, which may include, for example, memory and interfaces as previously described. The resources 320 may include memory and/or interfaces shared between the processor cores 310-1 to 310-4. The resources 320 may include memory and/or interfaces shared dedicated to individual processor cores. The resources 320 may include a combination of shared and dedicated memory and/or interfaces.

Each of the processor cores 310-1 to 310-4 may be associated with a respective voltage regulator 340-1 to 340-4. Each voltage regulator 340-1 to 340-4 may receive a primary voltage from a source such as the battery 160. Each voltage regulator 340-1 to 340-4 may output a respective regulated voltage 344-1 to 344-4 to power the associated processor core 310-1 to 310-4.

In the example of FIG. 3, processor core 310-1 runs a scheduler/voltage controller program 312 to schedule execution of a plurality of time-constrained processing tasks performed by the processor cores 310-1 to 310-4. To this end, the time-aware scheduler and voltage controller program 312 may be coupled to the time reference 140 as previously described. To minimize power consumption, the scheduler/voltage controller program 312 may cause the execution of some or all of the time-constrained processing to be slowed to fill all of the available time for each task. To this end, the scheduler/voltage controller program 312 may select a respective operating voltage level for some or all of the time-constrained processing tasks to control the execution speed of each task. The scheduler/voltage controller program 312 may then provide respective voltage requests 342-1 to 342-4 to the voltage regulators 340-1 to 340-4. Each voltage request 342-1 to 342-4 may indicate a respective requested operating voltage level appropriate to the processing task being performed by the associated processor core 310-1 to 310-4. Each voltage request 342-1 to 342-4 may convey the requested operating voltage level by way of an analog voltage or current value, a digital value, a frequency modulated signal, a pulse-width modulated signal or in some other manner.

The processor cores 310-1 to 310-4 may be identical, in which case any one of the processor cores 310-1 to 310-4 may be selected to run the scheduler/voltage controller program 312. Alternatively, the hardware of processor core 310-1 may be uniquely configured to run the scheduler/voltage controller program 312.

The processor cores 310-1 to 310-4, all or portions of the resources 320, and all or portions of the voltage regulators 340-1 to 340-4 may be implemented as a "system on a chip", which is to say implemented within a single integrated circuit chip. Each voltage regulator 340-1 to 340-4 may be a switching regulator circuit implemented with semiconductor devices such as transistors and diodes and one or more passive components such as inductors and/or capacitors. At least some of each voltage regulator's semiconductor devices may be formed on an integrated circuit chip that also contains the processor cores 310-1 to 310-4. All of each voltage regulator's semiconductor devices may be formed on the integrated circuit chip containing the processor cores 310-1 to 310-4, with one or more passive components of each voltage regulator located external to the integrated circuit chip. The voltage regulators 340-1 to 340-4 may be entirely formed on the integrated circuit chip containing the processor cores 310-1 to 310-4.

Figure 4:
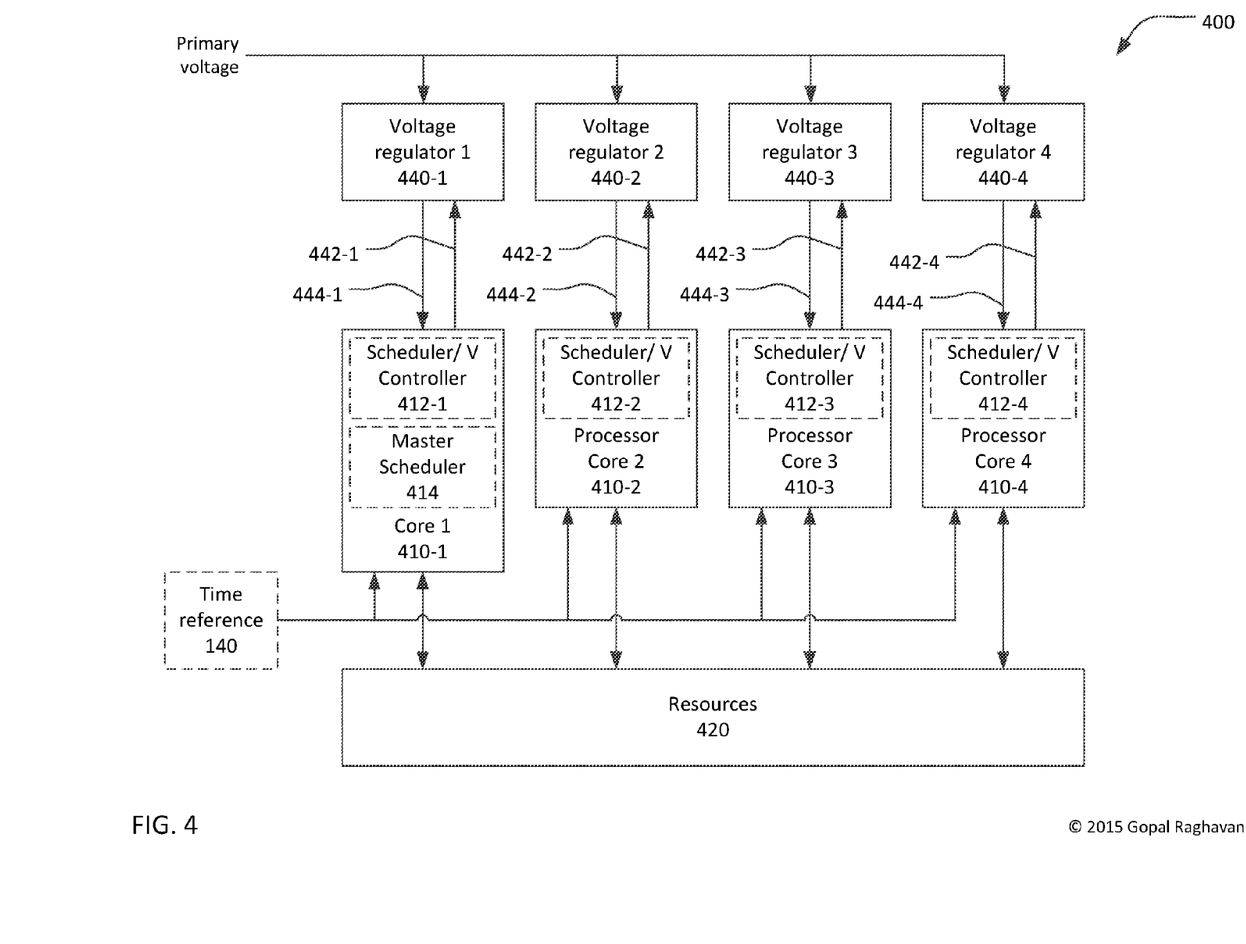
FIG. 4 is a block diagram of another multi-core asynchronous computing device.

Referring now to FIG. 4, an asynchronous processor 400 includes four processor cores 310-1, 310-2, 310-3, and 310-4. An asynchronous processor may have fewer or more than four processor cores. Each processor core 410-1 to 410-4 may access resources 420, which may include, for example, memory and interfaces which may be shared or dedicated as previously described.

Each of the processor cores 410-1 to 410-4 may be associated with a respective voltage regulator 440-1 to 440-4. Each voltage regulator 440-1 to 440-4 may receive a primary voltage from a source such as the battery 160. Each voltage regulator 440-1 to 440-4 may output a respective regulated voltage 444-1 to 444-4 to power the associated processor core 410-1 to 410-4.

In the example of FIG. 4, processor core 410-1 runs a master scheduler program 414 to assign time-constrained processing tasks to the processor cores 410-1 to 410-4. Each processor core 410-1 to 410-4 runs a respective scheduler and voltage controller program 412-1 to 412-4 to schedule respective assigned tasks. To this end, the time-aware scheduler and voltage controller programs 412-1 to 412-4 may be coupled to the time reference 140 as previously described. To minimize power consumption, the scheduler/voltage controller programs 412-1 to 412-4 may cause the execution of some or all of the time-constrained processing to be slowed to fill all of the available time for each task. To this end, the scheduler/voltage controller programs 412-1 to 412-4 may select a respective operating voltage level for some or all of the time-constrained processing tasks to control the execution speed of each task. The scheduler/voltage controller programs 412-1 to 412-4 may then provide respective voltage requests 442-1 to 442-4 to the voltage regulators 440-1 to 440-4. Each voltage request 442-1 to 442-4 may indicate a respective requested operating voltage level appropriate to the processing task being performed by the associated processor core 410-1 to 410-4. Each voltage request 442-1 to 442-4 may convey the requested operating voltage level by way of an analog voltage or current value, a digital value, a frequency modulated signal, a pulse-width modulated signal or in some other manner.

Description of Processes

Figure 5:
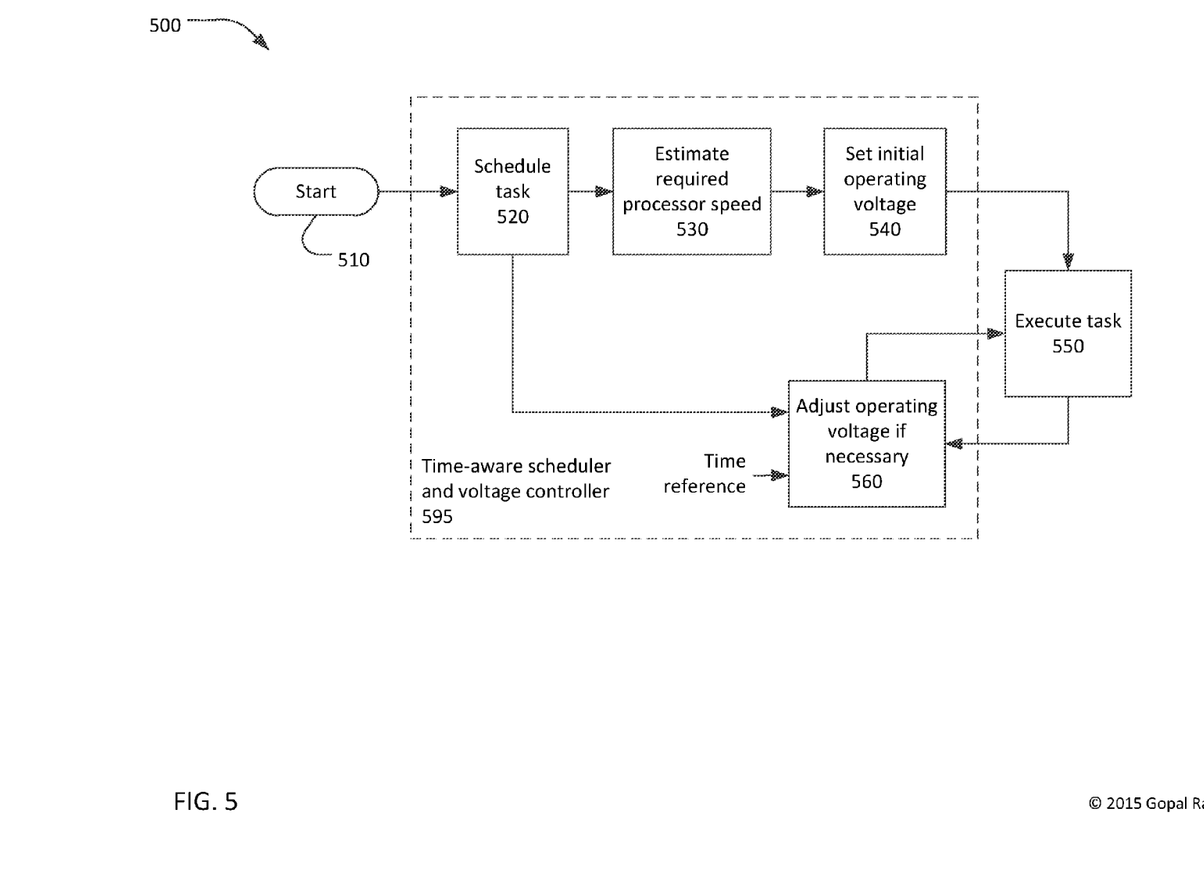
FIG. 5 is a flow chart of a process for performing a single task on an asynchronous processor.

Referring now to FIG. 5, a process 500 for executing a single task on an asynchronous processor may start at 510 when the task is assigned to the processor and the software instructions required to execute the task are made available to the processor. The asynchronous processor may be, for example, the asynchronous processor 100 or one of the processor cores of the multicore processors 300 and 400. The task to be executed may be subject to one or more time constraints, which may be embedded in the software instructions or otherwise communicated to the processor. The process 500 may continue perpetually and cyclically until the execution of the task is cancelled or otherwise stopped (not shown).

The actions at 520, 530, 540, and 560 may be performed by a time-aware scheduler and voltage controller program 595 running on the asynchronous processor. At 520, the task may be scheduled, which is to say the scheduler program may determine when, or how often, the task should be initiated and when, or how fast, each repetition of the task should be completed. The schedule for the task may be determined based, at least in part, on time constraints embedded in the software instructions for the task or otherwise communicated to the processor. For a simple example, a task may be subject to a time constraint that the task must be run at one-second intervals. If this is the only time constraint on the task, the task only need be completed just in time to start the next iteration of the task. For further example, the task may be subject to an additional time constraint that the task must be completed within a limited time period, such as the first 10 milliseconds of each second. In another example, a task may need to be run at defined processor speed to facilitate synchronization with some device or process external to the processor.

While asynchronous processors do not operate from a clock, an asynchronous processor does operate cyclically, with each cycle completed before the next cycle begins. Thus an asynchronous processor may be considered to operate at a particular speed, which is the inverse of the time required to complete a processor cycle. At 530, the processor speed required to complete the task as scheduled may be estimated by dividing a number of processor cycles needed to perform the task by the time available to perform the task (from 520). Equivalently, the required processor system time may be estimated by dividing the time available to perform the task by the number of cycles needed to perform the task.

The number of processor cycles required to perform the task may be embedded in the software instructions for the task or otherwise communicated to the asynchronous processor. The number of processor cycles required to perform the task may be estimated from the size of the software program or by counting the number of instructions in the software program prior to first performing the task. The number of processor cycles required to perform the task may be determined or estimated in some other manner.

At 540, an initial operating voltage may be set based on the required processor speed from 530. For example, the asynchronous processor may have access to a stored table that relates the required processor speed to an operating voltage level. An equation or algorithm may be used to convert the required processor speed into an operating voltage level. The table, equation, or algorithm may consider other parameters, such as a temperature of the asynchronous processor, to determine the operating voltage. The operating voltage to provide a required processor speed may be determined by other method. Once the operating voltage is determined, the asynchronous processor may provide a voltage request to a voltage regulator, such as the voltage regulator 150, which, in turn supplies the requested operating voltage to the asynchronous processor.

The table, equation, algorithm, or other method used to determine the required operating voltage to provide a given processor speed may be universal (i.e., applicable to all asynchronous processors of a given type) or may be customized for each particular asynchronous processor device. For example, each asynchronous processor device may be tested during manufacturing to determine a relationship between operating voltage and processor speed, or a relationship between operating voltage, temperature, and processor speed. The determined relationship could then be quantified in a table or a set of coefficients for a formula or algorithm and stored in a nonvolatile memory internal to or external to the asynchronous processor device.

The task may be executed at 550 with the asynchronous processor running on the operating voltage determined at 540. After completion of the task at 550, the operating voltage for the task may be adjusted at 560 if necessary to ensure the time constraints on the task are satisfied. The time actually used to perform the task may be determined based on an external time reference. The time actually used may be compared to the time allocated for the task at 520. If the time actually used was greater than the allocated time, the operating voltage may be increased to increase the asynchronous processor speed. If the time actually used was less than the allocated time, the operating voltage may be decreased to decrease the asynchronous processor speed.

The actions at 550 and 560 may repeated cyclically for a predetermined number of cycles or a predetermined time period. The actions at 550 and 560 may repeated perpetually or until stopped by an interrupt or other external input to the asynchronous processor.

Figure 6:
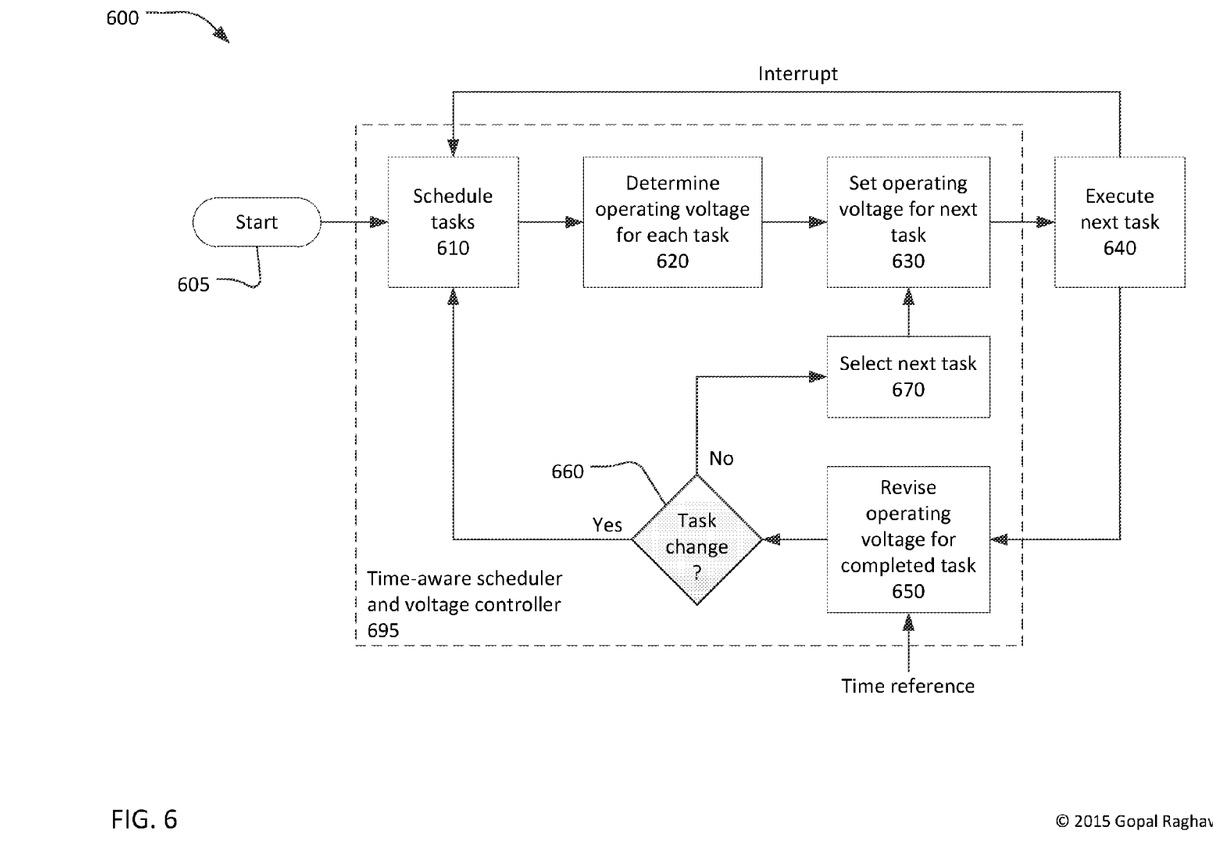
FIG. 6 is a flow chart of a process for performing multiple tasks on an asynchronous processor.

Referring now to FIG. 6, an exemplary process 600 for executing multiple tasks on an asynchronous processor may start at 605 when the tasks are assigned to the processor and the software instructions required to execute the tasks are made available to the processor. The asynchronous processor may be, for example, the asynchronous processor 100 or one of the processor cores of the multicore processors 300 and 400. The tasks to be executed may be subject to respective time constraints, which may be embedded in the software instructions or otherwise communicated to the processor. The process 600 may continue perpetually and cyclically until stopped (not shown). For multicore applications, such as those shown in FIG. 3 and FIG. 4, steps of the process 600 may be performed asynchronously for one or more of the cores, or synchronously in a pipeline manner, or some combination thereof.

The actions at 610 to 630 and 650 to 670 may be performed by a time-aware scheduler and voltage controller program 695 running on the asynchronous processor. At 610, the tasks may be scheduled based, at least in part, on time constraints embedded in the software instructions for the task or otherwise communicated to the processor. At 610, the scheduler program may determine when, or how often, each of the tasks should be initiated and when, or how fast, each of the tasks should be completed. The scheduler program may then establish a sequence in which the tasks are performed and allocate a respective time interval for the performance of each task.

At 620, a respective processor operating voltage may be determined for each task. First, a required processor speed may be estimated for each task based on the time allocated for the performance of the task and the number of processor cycles needed to complete the task, as previously described. A table, equation, algorithm or other method may then be used, as previously described, to determine the operating voltage required to provide the required processor speed. An operating voltage value for each of the tasks may be stored, for example in a table, for use each time the respective task is performed.

The operating voltage for a first task may then be set at 630. To set the operating voltage, the asynchronous processor may retrieve the stored operating voltage value for the task and provide a voltage request to a voltage regulator, such as the voltage regulator 150, which, in turn supplies the requested operating voltage to the asynchronous processor. The first task may then be executed at 640 with the asynchronous processor running on the operating voltage set at 630.

After completion of the task at 640, the operating voltage for the task may be adjusted at 650 if necessary to ensure the time constraints on the just-completed task are satisfied. The time actually used to perform the task may be determined based on an external time reference. The time actually used may be compared to the time allocated for the task at 610. If the time actually used was greater than the allocated time, the operating voltage for the task may be increased to increase the asynchronous processor speed. If the time actually used was less than the allocated time, the operating voltage may be decreased to decrease the asynchronous processor speed. Any change in the operating voltage for the task may be stored for use the next time the task is performed.

At 660, a determination may be made if there is a change in the tasks being performed by the asynchronous processor. The change may be, for example, the addition of a new task, the discontinuation of a previously performed task, or a change in the time constraints on one or more tasks. If the tasks being performed are changed ("yes" at 660), the process 600 may return to 610 to reschedule the tasks. The process 600 may also return to 610 at any time due to an interrupt or other external input.

If the tasks being performed are not changed ("no" at 660), a next task in the task sequence defined at 610 may be selected at 670. The process 600 may then return to 630, where the operating voltage may be set to the operating voltage value for the next task as determined at 620. The next task may then be performed at 640. The actions from 630 to 670 may be repeated cyclically, performing the task in the sequence defined at 610, until a "yes" determination at 660 or until stopped in some other manner (not shown).

Figure 7:
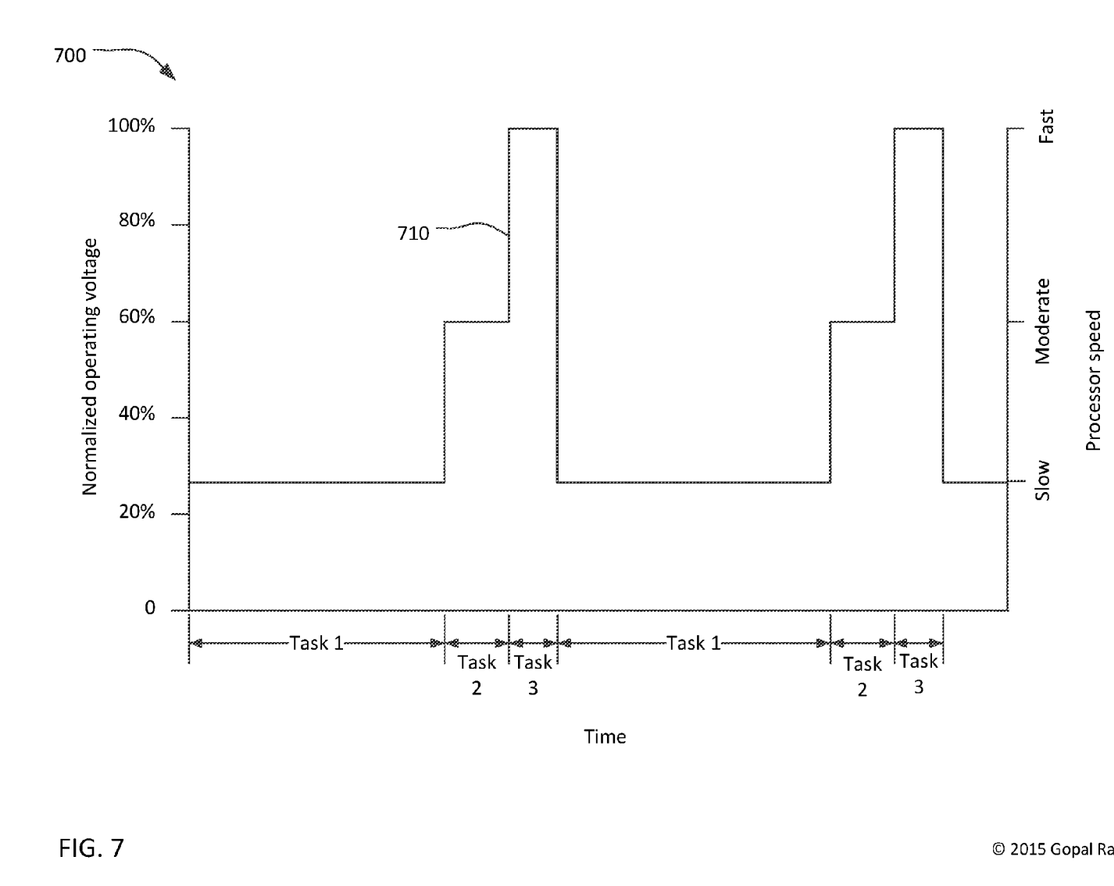
FIG. 7 is a graph of processor operating voltage versus time for an exemplary asynchronous computing device.

FIG. 7 shows a graph 710 of the operating voltage supplied to an asynchronous processor performing three exemplary tasks with different time constraints. The voltage shown in FIG. 7 is normalized, with a voltage value of 100% corresponding to a maximum processor operating voltage.

In this example, the processor may be embedded in a sensor node in the Internet of Things. Most of the time, the processor performs Task 1, which may be transferring data from the sensor to memory. When a sufficient quantity of data is collected, the processor performs Task 2, which may be to process and/or compress the previously collected data. Once the data is processed, the processor performs Task 3, which may to transmit the data wirelessly as fast as possible to minimize RF power. Task 3 requires the highest available processor speed and is thus performance at the highest operating voltage.

Using a current synchronous processor, these tasks would be performed intermittently, and the processor would be woken up each a task had to be performed. For Task 1, the awake period each time data is collected would be very short, such that the energy expended during wakeup and shutdown may exceed the energy expended on the actual task. If possible, Task 2 and Task 3 could be performed consecutively such that the processor would be on and running at full speed for the entire required to process and transmit the data.

Using an asynchronous computing device such as the computing device 100 with asynchronous processor 110, the processor may run a time aware scheduler and voltage controller program that allocates a respective time interval and determines a respective operating voltage for each of the three tasks. Task 1 requires very slow processor speed and may be performed, for example, using a minimum operating voltage of the asynchronous processor (assumed, in this example, to be 30% of the maximum voltage). Task 2 may be performed at 60% of the maximum operating voltage to provide moderate processor speed. Task 3 requires the highest available processor speed and is thus performance at the highest operating voltage. The operating voltages selected for Task 1 and Task 2 may spread the performance of each task over the longest available time interval. As was discussed in the introduction to this application, extending each task over the longest available time period in the lowest energy expenditure for each task.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined, performed in different order, or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computing device, comprising:
   an asynchronous processor operative from an operating voltage;
   a voltage regulator circuit that outputs the operating voltage to the asynchronous processor in response to a voltage request received from the asynchronous processor; and
   a memory coupled to the asynchronous processor, the memory storing a time-aware scheduler and voltage controller program that, when executed by the asynchronous processor, causes the computing device to perform actions including:
      scheduling one or more tasks, wherein each task is subject to at least one time constraint, by allocating a respective time interval for the performance of each task such that all time constraints on all of the one or more tasks are satisfied;
      selecting, for each of the one or more tasks, a respective operating voltage that causes the performance of each task to consume substantially all of the respective allocated time interval; and
      sending respective voltage requests to the voltage regulator circuit to cause the voltage regulator circuit to adjust the respective operating voltage during execution of each of the one or more tasks.

2. The computing device of claim 1, wherein the asynchronous processor and at least a portion of the voltage regulator circuit are included on the same integrated circuit chip.

3. The computing device of claim 2, wherein the asynchronous processor and all of the semiconductor components of the voltage regulator circuit are included on the same integrated circuit chip.

4. The computing device of claim 3, wherein the asynchronous processor and all of the components of the voltage regulator circuit are included on the same integrated circuit chip.

5. The computing device of claim 1, the actions performed further comprising:
   determining, based on a time reference, whether or not all time constraints on all of the one or more tasks are satisfied.

6. The computing device of claim 5, the actions performed further comprising:
   when the result of the determining indicate that a time constraint on a particular task of the one or more tasks was not satisfied, adjusting the selected operating voltage for the particular task.

7. The computing device of claim 1, wherein
   the memory comprises static random access memory operative from the operating voltage.

8. A method of operating an asynchronous processor, comprising:
   providing an operating voltage to the asynchronous processor from a voltage regulator circuit responsive to a voltage request received from the asynchronous processor;
   scheduling one or more tasks, wherein each task is subject to at least one time constraint, by allocating a respective time interval for the performance of each task such that all time constraints on all of the one or more tasks are satisfied;
   selecting, for each of the one or more tasks, a respective operating voltage that causes the performance of each task to consume substantially all of the respective allocated time interval; and
   sending respective voltage requests to the voltage regulator circuit to cause the voltage regulator circuit to output the respective operating voltage during execution of each of the one or more tasks.

9. The method of claim 8, further comprising:
   determining, based on a time reference, whether or not all time constraints on all of the one or more tasks are satisfied.

10. The method of claim 9, further comprising:
    when the result of the determining indicate that a time constraint on a particular task of the one or more tasks was not satisfied, adjusting the selected operating voltage for the particular task.

11. A computing device, comprising:
    a plurality of asynchronous processor cores operative from respective operating voltages;
    a corresponding plurality of voltage regulator circuits, each of which outputs the respective operating voltage to the corresponding asynchronous processor in response to a voltage request; and
    a memory coupled to one or more of the plurality of asynchronous processor cores, the memory storing a time-aware scheduler and voltage controller program that, when executed by one or more of the asynchronous processor cores, causes the computing device to perform actions including:
    assigning one or more respective tasks, from a plurality of tasks, to each of the plurality of asynchronous processor cores; and
    for each of the plurality of asynchronous processor cores:
       scheduling the one or more assigned tasks, wherein each assigned task is subject to at least one time constraint, by allocating a respective time interval for the performance of each assigned task such that all time constraints on all of the one or more assigned tasks are satisfied;
       selecting, for each of the one or more assigned tasks, a respective operating voltage that causes the performance of each assigned task to consume substantially all of the respective allocated time interval, and
       sending respective voltage requests to the corresponding voltage regulator circuit to cause the voltage regulator circuit to set the respective operating voltage during execution of each of the one or more assigned tasks.

12. The computing device of claim 11, wherein the plurality of asynchronous processor cores and at least portions of the plurality of the voltage regulator circuits are included on the same integrated circuit chip.

13. The computing device of claim 12, wherein the plurality of asynchronous processor cores and all semiconductor components of the plurality of the voltage regulator circuits are included on the same integrated circuit chip.

14. The computing device of claim 13, wherein the plurality of asynchronous processor cores and all components of the plurality of the voltage regulator circuits are included on the same integrated circuit chip.

15. A computing device, comprising:
a memory;
an asynchronous processor operative from an operating voltage, the asynchronous processor comprising a collection of asynchronous logic circuits that are collectively capable of executing instructions stored in the memory; and
a voltage regulator circuit that outputs the operating voltage to the asynchronous processor in response to a voltage request received from the asynchronous processor,
wherein the memory stores a time-aware scheduler and voltage controller program that, when executed by the asynchronous processor, causes the computing device to perform actions including:
scheduling one or more tasks;
selecting a respective operating voltage for each of the one or more tasks; and
sending respective voltage requests to the voltage regulator circuit to cause the voltage regulator circuit to adjust the respective operating voltage during execution of each of the one or more tasks.

16. The computing device of claim 15, where the asynchronous processor does not operate from a clock.

* * * * *